United States Patent
Glass et al.

(10) Patent No.: US 9,483,786 B2
(45) Date of Patent: Nov. 1, 2016

(54) GIFT CARD ORDERING SYSTEM AND METHOD

(71) Applicant: Gift Card Impressions, LLC, Kansas City, MO (US)

(72) Inventors: Brett R. Glass, Kansas City, MO (US); Nicole E. Glass, Kansas City, MO (US)

(73) Assignee: Gift Card Impressions, LLC, Kansas City, MO (US)

( * ) Notice: Subject to any disclaimer, the term of this patent is extended or adjusted under 35 U.S.C. 154(b) by 699 days.

(21) Appl. No.: 13/940,436

(22) Filed: Jul. 12, 2013

(65) Prior Publication Data

US 2013/0304605 A1    Nov. 14, 2013

Related U.S. Application Data

(63) Continuation-in-part of application No. 13/273,220, filed on Oct. 13, 2011, now Pat. No. 9,031,869.

(60) Provisional application No. 61/737,731, filed on Dec. 14, 2012.

(51) Int. Cl.
*G06Q 30/00* (2012.01)
*G06Q 30/06* (2012.01)
*G06Q 30/02* (2012.01)
(Continued)

(52) U.S. Cl.
CPC .......... *G06Q 30/0621* (2013.01); *G06Q 30/02* (2013.01); *G06Q 30/0207* (2013.01); *G06Q 30/06* (2013.01); *G06Q 40/02* (2013.01); *G06Q 50/01* (2013.01)

(58) Field of Classification Search
CPC .................................. G06Q 30/0601–30/0643
See application file for complete search history.

(56) References Cited

U.S. PATENT DOCUMENTS

| 4,611,262 A | 9/1986 | Galloway et al. |
| 4,703,573 A | 11/1987 | Montgomery et al. |
| 5,063,698 A | 11/1991 | Johnson et al. |

(Continued)

FOREIGN PATENT DOCUMENTS

| EP | 0596171 A1 | 5/1994 |
| WO | 2013/116406 A2 | 8/2013 |

(Continued)

OTHER PUBLICATIONS

International Search Report and Written Opinion, PCT/US2013/023945, May 3, 2013, Personalized Gifting System.

(Continued)

*Primary Examiner* — William Allen
(74) *Attorney, Agent, or Firm* — Polsinelli PC

(57) ABSTRACT

A personalized gift card creation system and method includes providing an application to be executed on a computing device in which the application includes a peripheral application program interface (API) for interfacing with one or more peripheral devices of the computing device. A server in communication with the application generates a graphical user interface (GUI) on the computing device using the application, receives at least one of user-supplied textual, audio, or video content from the one or more peripheral devices using the application, and generates a gift card holder from the received user-supplied content. The server also receives information associated with a merchant of a gift card and a monetary amount to be associated with the gift card, and transmits the gift card holder and the gift card to a recipient.

22 Claims, 10 Drawing Sheets

(51) Int. Cl.
*G06Q 40/02* (2012.01)
*G06Q 50/00* (2012.01)

(56) References Cited

U.S. PATENT DOCUMENTS

| | | |
|---|---|---|
| 5,251,251 A | 10/1993 | Barber et al. |
| 5,425,078 A | 6/1995 | Stern |
| 5,444,767 A | 8/1995 | Goetcheus et al. |
| 5,490,206 A | 2/1996 | Stern |
| 5,513,117 A | 4/1996 | Small |
| 5,570,414 A | 10/1996 | Stern |
| 5,652,606 A | 7/1997 | Sasaki et al. |
| 5,719,920 A | 2/1998 | Harman |
| 6,085,242 A | 7/2000 | Chandra |
| 6,192,407 B1 | 2/2001 | Smith et al. |
| 6,288,319 B1 | 9/2001 | Catona |
| 6,356,626 B1 | 3/2002 | Ohara et al. |
| 6,360,254 B1 | 3/2002 | Linden et al. |
| 6,487,599 B1 | 11/2002 | Smith et al. |
| 6,529,956 B1 | 3/2003 | Smith et al. |
| 6,573,880 B1 | 6/2003 | Simoni et al. |
| 6,666,378 B2 | 12/2003 | Davila et al. |
| 6,850,248 B1 | 2/2005 | Crosby et al. |
| 6,965,912 B2 | 11/2005 | Friedman et al. |
| 7,127,841 B1 | 10/2006 | Weber |
| 7,152,350 B2 | 12/2006 | Youngdahl et al. |
| 7,203,287 B2 | 4/2007 | Turner et al. |
| 7,216,092 B1 | 5/2007 | Weber et al. |
| 7,222,797 B2 | 5/2007 | Davila et al. |
| 7,356,950 B1 | 4/2008 | Avery |
| 7,359,954 B2 | 4/2008 | Friedman et al. |
| 7,360,710 B2 | 4/2008 | Lindahl et al. |
| 7,370,076 B2 | 5/2008 | Friedman et al. |
| 7,478,143 B1 | 1/2009 | Friedman et al. |
| 7,535,996 B2 | 5/2009 | Turner |
| 7,606,857 B2 | 10/2009 | Friedman et al. |
| 7,702,542 B2 | 4/2010 | Aslanian, Jr. |
| 7,711,620 B2 | 5/2010 | Abifaker |
| 7,797,378 B2 | 9/2010 | Friedman et al. |
| 7,802,386 B2 | 9/2010 | Mandelbaum et al. |
| 7,953,654 B2 | 5/2011 | Abifaker |
| 7,959,065 B2 | 6/2011 | Rosenblatt et al. |
| 7,967,215 B2 | 6/2011 | Kumar |
| 7,970,657 B2 | 6/2011 | Morgenstern |
| 7,975,927 B1 | 7/2011 | Whitney |
| 8,011,122 B2 | 9/2011 | Clegg |
| 8,046,266 B1 | 10/2011 | Geller |
| 8,200,544 B1 | 6/2012 | Jones et al. |
| 8,280,775 B2 | 10/2012 | Armstrong |
| 8,280,825 B2 | 10/2012 | Friedman |
| 8,308,554 B2 | 11/2012 | Rowe et al. |
| 8,342,391 B2 | 1/2013 | Morrison et al. |
| 8,396,758 B2 | 3/2013 | Paradise et al. |
| 8,396,772 B2 | 3/2013 | Abifaker |
| 8,478,661 B1 | 7/2013 | Kressler |
| 8,561,894 B1 | 10/2013 | Mullen et al. |
| 8,571,524 B2 | 10/2013 | Atarius |
| 8,577,735 B2 | 11/2013 | Wilen et al. |
| 8,860,865 B2 | 10/2014 | Dukellis et al. |
| 9,002,839 B1 | 4/2015 | Rospo |
| 9,031,869 B2 * | 5/2015 | Glass ............... G06Q 30/0621 705/26.5 |
| 9,104,237 B1 | 8/2015 | Glass et al. |
| 9,152,992 B1 | 10/2015 | Vippagunta et al. |
| 2001/0005834 A1 | 6/2001 | Simpson |
| 2001/0040560 A1 | 11/2001 | Amron |
| 2001/0043164 A1 | 11/2001 | Thagard et al. |
| 2001/0043194 A1 | 11/2001 | Amron |
| 2002/0116531 A1 | 8/2002 | Chu |
| 2002/0118948 A1 | 8/2002 | Jones |
| 2002/0138573 A1 | 9/2002 | Saguy |
| 2002/0138843 A1 | 9/2002 | Samaan et al. |
| 2003/0001005 A1 | 1/2003 | Risafi et al. |
| 2003/0001846 A1 | 1/2003 | Davis et al. |
| 2003/0033305 A1 | 2/2003 | O'Connor et al. |
| 2003/0046150 A1 | 3/2003 | Ader et al. |
| 2003/0055735 A1 | 3/2003 | Cameron et al. |
| 2003/0191655 A1 | 10/2003 | Janz |
| 2003/0192209 A1 | 10/2003 | Yeh |
| 2004/0010550 A1 | 1/2004 | Gopinath |
| 2004/0139318 A1 | 7/2004 | Fiala et al. |
| 2004/0150983 A1 | 8/2004 | Sexton et al. |
| 2004/0167819 A1 | 8/2004 | Keating |
| 2004/0205138 A1 | 10/2004 | Friedman et al. |
| 2004/0217877 A1 | 11/2004 | Kokonaski et al. |
| 2004/0248073 A1 | 12/2004 | Pinkerman et al. |
| 2005/0004878 A1 | 1/2005 | Malone |
| 2005/0086168 A1 | 4/2005 | Alvarez et al. |
| 2005/0116028 A1 | 6/2005 | Cohen et al. |
| 2005/0228899 A1 | 10/2005 | Wendkos et al. |
| 2005/0270280 A1 | 12/2005 | Riback et al. |
| 2006/0015359 A1 | 1/2006 | Merritt |
| 2006/0028951 A1 | 2/2006 | Tozun et al. |
| 2006/0037835 A1 | 2/2006 | Doran et al. |
| 2006/0074767 A1 | 4/2006 | Fortney et al. |
| 2006/0134591 A1 | 6/2006 | Karat |
| 2006/0149585 A1 | 7/2006 | Mori et al. |
| 2006/0184386 A1 * | 8/2006 | Merritt ............... G06Q 30/00 705/26.1 |
| 2007/0038577 A1 | 2/2007 | Werner et al. |
| 2007/0038716 A1 | 2/2007 | Saguy |
| 2007/0080214 A1 | 4/2007 | Collas et al. |
| 2007/0143133 A1 | 6/2007 | Velcoff |
| 2007/0153638 A1 | 7/2007 | Lebbing |
| 2007/0168237 A1 | 7/2007 | Campbell |
| 2007/0168283 A1 | 7/2007 | Alvarez et al. |
| 2007/0169387 A1 | 7/2007 | Glass |
| 2007/0171278 A1 | 7/2007 | Chen |
| 2007/0215699 A1 | 9/2007 | Arego et al. |
| 2007/0266413 A1 | 11/2007 | Davis et al. |
| 2007/0282697 A1 | 12/2007 | Kirby |
| 2007/0284269 A1 | 12/2007 | Star |
| 2008/0099551 A1 | 5/2008 | Harper et al. |
| 2008/0116088 A1 | 5/2008 | Roberts |
| 2008/0119952 A1 | 5/2008 | Smith et al. |
| 2008/0189368 A1 | 8/2008 | Rothschild |
| 2008/0228597 A1 | 9/2008 | Sondles |
| 2008/0235095 A1 | 9/2008 | Oles et al. |
| 2008/0249657 A1 | 10/2008 | Wendland et al. |
| 2008/0249882 A1 | 10/2008 | Spolar |
| 2008/0289230 A1 | 11/2008 | Mandelbaum et al. |
| 2008/0294977 A1 | 11/2008 | Friedman et al. |
| 2009/0027566 A1 | 1/2009 | Wargon |
| 2009/0030694 A1 | 1/2009 | Stern |
| 2009/0063297 A1 * | 3/2009 | Dooley ............... G06Q 20/382 705/64 |
| 2009/0070213 A1 | 3/2009 | Miller et al. |
| 2009/0138396 A1 | 5/2009 | Boal |
| 2009/0171804 A1 | 7/2009 | Lee |
| 2009/0177545 A1 | 7/2009 | Castineiras |
| 2009/0187491 A1 | 7/2009 | Bull |
| 2009/0192928 A1 | 7/2009 | Abifaker |
| 2009/0199275 A1 | 8/2009 | Brock et al. |
| 2009/0211126 A1 | 8/2009 | Oh |
| 2009/0216653 A1 | 8/2009 | Sanguinetti et al. |
| 2009/0238544 A1 | 9/2009 | Orsini |
| 2009/0254453 A1 | 10/2009 | Sanguinetti et al. |
| 2009/0281794 A1 | 11/2009 | Ben-Haroush et al. |
| 2009/0327129 A1 | 12/2009 | Collas et al. |
| 2010/0004935 A1 | 1/2010 | Wain |
| 2010/0005377 A1 | 1/2010 | Batan |
| 2010/0011632 A1 | 1/2010 | Shields et al. |
| 2010/0013653 A1 | 1/2010 | Birnbaum et al. |
| 2010/0013761 A1 | 1/2010 | Birnbaum et al. |
| 2010/0017278 A1 | 1/2010 | Wilen et al. |
| 2010/0017489 A1 | 1/2010 | Birnbaum et al. |
| 2010/0017759 A1 | 1/2010 | Birnbaum et al. |
| 2010/0041368 A1 | 2/2010 | Kumar |
| 2010/0045619 A1 | 2/2010 | Birnbaum et al. |
| 2010/0050205 A1 | 2/2010 | Davis et al. |
| 2010/0052876 A1 | 3/2010 | Clegg |
| 2010/0052934 A1 | 3/2010 | Clegg |
| 2010/0089990 A1 | 4/2010 | Spaulding |
| 2010/0121926 A1 | 5/2010 | Catalano |

(56) References Cited

U.S. PATENT DOCUMENTS

| | | | |
|---|---|---|---|
| 2010/0123002 A1 | 5/2010 | Caporicci | |
| 2010/0174618 A1 | 7/2010 | Driessen | |
| 2010/0175287 A1 | 7/2010 | Gupta et al. | |
| 2010/0198678 A1 | 8/2010 | Burst et al. | |
| 2010/0211448 A1 | 8/2010 | Beenau et al. | |
| 2010/0250255 A1 | 9/2010 | Stern | |
| 2010/0280921 A1 | 11/2010 | Stone et al. | |
| 2010/0299192 A1 | 11/2010 | Aslanian, Jr. | |
| 2010/0325006 A1* | 12/2010 | White | G06Q 20/105 705/26.1 |
| 2011/0004533 A1 | 1/2011 | Soto et al. | |
| 2011/0010251 A1 | 1/2011 | Silva | |
| 2011/0041086 A1 | 2/2011 | Kim et al. | |
| 2011/0047182 A1 | 2/2011 | Shepherd et al. | |
| 2011/0054906 A1 | 3/2011 | Stern | |
| 2011/0106698 A1* | 5/2011 | Isaacson | G06Q 20/105 705/41 |
| 2011/0125607 A1 | 5/2011 | Wilen | |
| 2011/0145698 A1 | 6/2011 | Penov et al. | |
| 2011/0153462 A1 | 6/2011 | Granich | |
| 2011/0161226 A1 | 6/2011 | Courtion et al. | |
| 2011/0210160 A1 | 9/2011 | Vantieghem | |
| 2011/0234514 A1 | 9/2011 | Gothard | |
| 2011/0251962 A1 | 10/2011 | Hruska | |
| 2011/0271196 A1 | 11/2011 | Rakowski et al. | |
| 2011/0288978 A1 | 11/2011 | Abifaker | |
| 2011/0289411 A1 | 11/2011 | Kulkarni et al. | |
| 2012/0022924 A1 | 1/2012 | Runnels et al. | |
| 2012/0109787 A1 | 5/2012 | Larrick et al. | |
| 2012/0117473 A1* | 5/2012 | Han | G11B 27/034 715/723 |
| 2012/0123895 A1* | 5/2012 | Horvitz | G06Q 30/0621 705/26.5 |
| 2012/0150740 A1 | 6/2012 | Isaacson et al. | |
| 2012/0209688 A1 | 8/2012 | Lamothe et al. | |
| 2012/0226588 A1 | 9/2012 | Wuhrer et al. | |
| 2012/0271732 A1 | 10/2012 | Glass et al. | |
| 2012/0276880 A1* | 11/2012 | Angorn | H04W 4/12 455/414.1 |
| 2012/0316983 A1 | 12/2012 | Shinnebarger et al. | |
| 2013/0046638 A1 | 2/2013 | Shepherd et al. | |
| 2013/0132169 A1* | 5/2013 | Dooley | G06Q 30/00 705/14.1 |
| 2013/0159445 A1* | 6/2013 | Zonka | G06Q 10/1093 709/206 |
| 2013/0173363 A1 | 7/2013 | Chen | |
| 2013/0211970 A1 | 8/2013 | Glass et al. | |
| 2013/0325671 A1 | 12/2013 | Glass et al. | |
| 2014/0058873 A1 | 2/2014 | Sorensen et al. | |
| 2014/0074654 A1 | 3/2014 | Friedman | |
| 2014/0074704 A1 | 3/2014 | White et al. | |
| 2014/0081769 A1 | 3/2014 | Wilen et al. | |
| 2014/0108177 A1 | 4/2014 | Erke et al. | |
| 2014/0164159 A1 | 6/2014 | Lovelace | |
| 2014/0330660 A1 | 11/2014 | Glass et al. | |
| 2015/0019445 A1 | 1/2015 | Glass et al. | |
| 2015/0039433 A1 | 2/2015 | Raina et al. | |
| 2015/0106225 A1 | 4/2015 | Glass et al. | |
| 2015/0178701 A1 | 6/2015 | Glass et al. | |
| 2015/0213535 A1 | 7/2015 | Glass | |
| 2015/0220902 A1 | 8/2015 | Glass et al. | |
| 2015/0317711 A1 | 11/2015 | Glass et al. | |
| 2015/0356649 A1 | 12/2015 | Glass et al. | |
| 2016/0019630 A1* | 1/2016 | Vippagunta | G06Q 30/0631 705/26.8 |
| 2016/0026249 A1 | 1/2016 | Glass et al. | |
| 2016/0036739 A1 | 2/2016 | Glass et al. | |
| 2016/0036758 A1 | 2/2016 | Glass et al. | |

FOREIGN PATENT DOCUMENTS

| | | |
|---|---|---|
| WO | 2014/015365 A1 | 1/2014 |
| WO | 2014/029026 A1 | 2/2014 |
| WO | 2014/176352 A1 | 10/2014 |
| WO | 2014/179597 A1 | 11/2014 |
| WO | 2014/179611 A1 | 11/2014 |

OTHER PUBLICATIONS

International Preliminary Report on Patentability (Chapter I of the Patent Cooperation Treaty) from related International Application No. PCT/US2014/036432, dated Nov. 12, 2015; 7 pgs.

International Search Report and Written Opinion from related International Application No. PCT/US2014/036432, dated Sep. 9, 2014; 8 pgs.

International Preliminary Report on Patentability (Chapter I of the Patent Cooperation Treaty) from related International Application No. PCT/US2014/036408, dated Nov. 12, 2015; 11 pgs.

International Search Report and Written Opinion from related International Application No. PCT/US2014/036408, dated Sep. 9, 2014; 12 pgs.

International Search Report and Written Opinion from related International Application No. PCT/US2014/035171, dated Sep. 22, 2014; 7 pgs.

Office Action from related U.S. Appl. No. 14/822,683, dated Mar. 17, 2016; 12 pgs.

Office Action from related U.S. Appl. No. 14/818,397, dated Feb. 2, 2016; 14 pgs.

Office Action from related U.S. Appl. No. 14/456,707, dated Nov. 10, 2015; 24 pgs.

Office Action from related U.S. Appl. No. 14/456,707, dated Apr. 16, 2015; 28 pgs.

Office Action from related U.S. Appl. No. 14/456,707, dated Oct. 17, 2014; 25 pgs.

Office Action from related U.S. Appl. No. 14/231,349, dated Oct. 6, 2014; 15 pgs.

Office Action from related U.S. Appl. No. 14/231,349, dated Jun. 27, 2014; 12 pgs.

Office Action from related U.S. Appl. No. 13/964,895, dated Mar. 2, 2016; 14 pgs.

Office Action from related U.S. Appl. No. 13/964,895, dated Aug. 10, 2015; 11 pgs.

Office Action from related U.S. Appl. No. 13/753,453, dated Jun. 27, 2016; 22 pgs.

Office Action from related U.S. Appl. No. 13/753,453, dated Nov. 9, 2015; 17 pgs.

Office Action from related U.S. Appl. No. 13/753,453, dated Apr. 7, 2015; 19 pgs.

Office Action from related U.S. Appl. No. 13/273,220, dated Oct. 27, 2014; 8 pgs.

Office Action from related U.S. Appl. No. 13/273,220, dated Jul. 14, 2014; 8 pgs.

Office Action from related U.S. Appl. No. 13/273,220, dated Jan. 7, 2014; 20 pgs.

Office Action from related U.S. Appl. No. 13/273,220, dated Aug. 21, 2013; 15 pgs.

Elevate Digital advertisement of services.

Elevate Digital advertising specs.

Olive Garden—screen shots of actual kiosk screens.

Subway—screen shots of actual kiosk screens.

www.GiftCardImpressions.com. Jul. 6, 2008 to Oct. 13, 2008. [recovered from www.Archive.org].

SB Apps, Blow Fast Lite!, Feb. 23, 2012 (https://itunes.apple.com/us/app/blow-fast-lite!/id419232209?mt=8).

Office Action from related U.S. Appl. No. 14/456,707, dated Aug. 12, 2016; 25 pgs.

\* cited by examiner

Fig. 4

Settings

Sign In

Need Help?

Terms of Service

Done

Fig. 5

Sign In

E-mail: 
Password:

Sign In

Fig. 6

Register New Account

"Creating an account will save your billing address for future purchases."

E-mail: 
Password: 
Confirm Password:

Register

Checkout as Guest

◄ Back    Continue ►

Fig. 7

Recipient Information

Name: 
E-mail:

Message ▼

◄ Back    Continue ►

Fig. 8

Recipient Information

- Recipient Location:
- Recipient Age:
- 3 Likes/Interests:
- Naughty? Why?

◀ Back | Continue ▶

Fig. 9

Select an Occasion

| Congratulations |
| Birthday |
| Wedding |
| New Baby |
| Back to School |
| Just Because |
| Graduation |
| Holiday |

Fig. 10

Select a Gift Card Holder

◀ Gift Card Holder Design 1 ▶

Tap card to view inside

◀ Back | Continue ▶

Fig. 11

Customize Gift Card Holder

Gift Card Holder Design 1 (exterior cover)

Add photo
- Upload from social media site
- Upload from phone
- Take a picture ◀ Back | Continue ▶

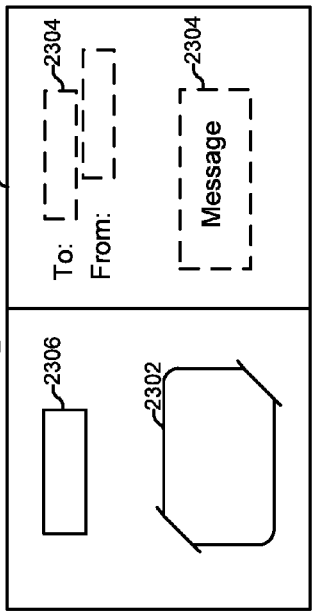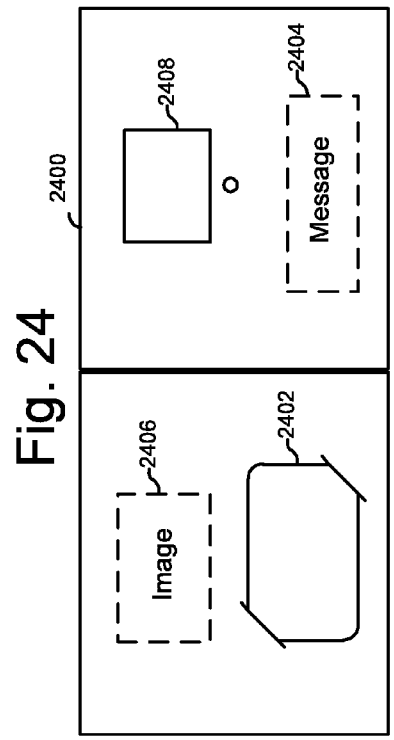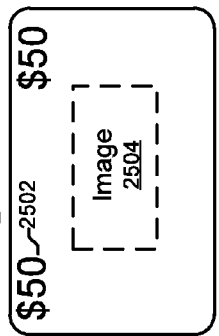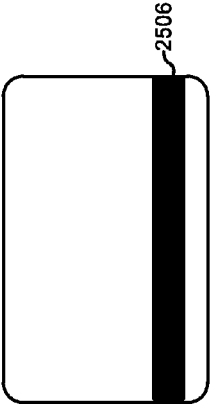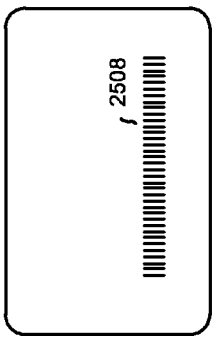

GIFT CARD ORDERING SYSTEM AND METHOD

RELATED APPLICATIONS

This application takes priority to U.S. patent application Ser. No. 61/737,731, filed Dec. 14, 2012, and entitled "Online Personalized Gifting System," and is a continuation in part of application Ser. No. 13/273,220, filed Oct. 13, 2011, and entitled "Online Personalized Gifting System." The contents of 61/737,731 and 13/273,220 are both incorporated herein by reference in their entirety.

FEDERALLY SPONSORED RESEARCH OR DEVELOPMENT

Not Applicable.

COMPACT DISK APPENDIX

Not Applicable.

BACKGROUND

This invention relates generally to gift cards and more particularly to a system for improving the overall giftability of gift cards by providing means for users to add numerous personalization options to physical gift card holders as well as the personalization of other digital communications mediums to communicate a sentiment, occasion, message, and/or gift card brand experience. A system according to the invention also includes a computing device of the user that generates a user interface having application program interfaces (APIs) that interface with one or more peripheral devices of the computing device to receive and process user-supplied content.

Transaction cards, stored value cards, or gift cards as they are commonly called based upon their intended use, have become popular gifts. Gift cards typically comprise a stored value card whereby a certain cash equivalent value is encoded upon a magnetic strip applied to the surface of the card. This stored value is determined by the vendor prior to packaging and display for sale or is selected at the point of sale by the purchaser and loaded by the cashier using a magnetic card reader/writer.

Gift card holders for gift cards have been used both to simply store gift cards and to provide a surface for decorative indicia and graphics, as well as personalized or pre-printed text. Gift card holders also includes a sound generating device to provide user initiated sound for its recipient.

What is needed is a system that provides for personalization of gift card holders via an online, interactive ordering platform, whereby a user may select from content provided by the system as well as upload personalized content for inclusion in the production of the holder using a user interface including application program interfaces (APIs) that interface with one or more peripheral devices of a computing device of the user.

SUMMARY

Embodiments of the gift card ordering system and method provides a solution to conventional gift card purchasing systems by incorporating one or more peripheral application program interfaces (APIs) of an application executed on a user's computing device for obtaining user-supplied content for inclusion on a gift card holder/gift card combination to be sent to a recipient. The application is any type of application executable on a computing device of the user, such as code rendered by a web browser or application software (i.e., a mobile app) that is executed by the computing device, which may be, for example, a tablet computer or a wireless communication device.

According to one aspect of the disclosure, a personalized gift card creation method includes providing an application to be executed on a computing device in which the application includes one or more peripheral APIs for interfacing with one or more peripheral devices of the computing device. A server in communication with the application generates a graphical user interface (GUI) on the computing device using the application, receives at least one of user-supplied textual, audio, or video content from the one or more peripheral devices using the application, and generates a gift card holder from the received user-supplied content. The server also receives information associated with a merchant of a gift card and a monetary amount to be associated with the gift card, and transmits the gift card holder and the gift card to a recipient.

According to another aspect of the disclosure, a personalized gift card creation system includes an application executable by at least one processor of a computing device in which the application has one or more APIs for interfacing with one or more peripheral devices of the computing device. The application generates a GUI on the computing device, receives at least one of user-supplied textual, audio, or video content from the one or more peripheral devices using the API, receives gift card information associated with a merchant of a gift card and a monetary amount to be associated with the gift card, and transmits the received user-supplied content to a server. A server in communication with the application generates a gift card holder from the received user-supplied textual, audio, or video content, provides a gift card associated with the received gift card information, and transmits the gift card holder and the gift card to a recipient.

According to yet another aspect of the disclosure, code implemented on a non-transitory, computer-readable medium is operable to generate a GUI on the computing device using an application. The application including one or more APIs for interfacing with one or more peripheral devices of the computing device. The code also generates a GUI on the computing device using the application, receives at least one of user-supplied textual, audio, or video content from the one or more peripheral devices using the application, generates a gift card holder from the received user-supplied textual, audio, or video content, receives information associated with a merchant of a gift card and a monetary amount to be associated with the gift card, and transmits the gift card holder and the gift card to a recipient.

BRIEF DESCRIPTION OF THE DRAWINGS

FIG. 4 illustrates an example of a settings page of a user interface according to an aspect of the gift card ordering system.

FIG. 5 illustrates an example of a sign in page of a user interface according to an aspect of the gift card ordering system.

FIG. 6 illustrates an example of a registration page of a user interface according to an aspect of the gift card ordering system.

FIG. 7 illustrates an example of a recipient information entry page of a user interface according to an aspect of the gift card ordering system.

FIG. 8 illustrates an example of a recipient information entry page of a user interface according to an aspect of the gift card ordering system.

FIG. 9 illustrates an example of an occasion selection page of a user interface according to an aspect of the gift card ordering system.

FIG. 10 illustrates an example of a gift card holder selection page of a user interface according to an aspect of the gift card ordering system.

FIG. 11 illustrates an example of a photo selection page of a user interface according to an aspect of the gift card ordering system.

FIGS. 23 and 24 illustrate example gift card holder/gift card combinations that is generated by the gift card ordering system according to an aspect of the present disclosure.

FIGS. 25A through 25C illustrate several example gift cards that is used with the gift card ordering system according to an aspect of the present disclosure.

DETAILED DESCRIPTION

Although gift cards have been become a commonly accepted gifting medium, their use has not been without limitation. For example, conventional gift cards are generally impersonal in that they typically do not include any personal sentiment that the user (i.e., sender) would like to convey to his or her recipient. Embodiments of the present disclosure provide a solution to this problem using an application executed on a computing device that obtains content for inclusion on a gift card holder from one or more peripheral devices of the computing device using application program interfaces (APIs) that interface with these devices.

Figure 1A:
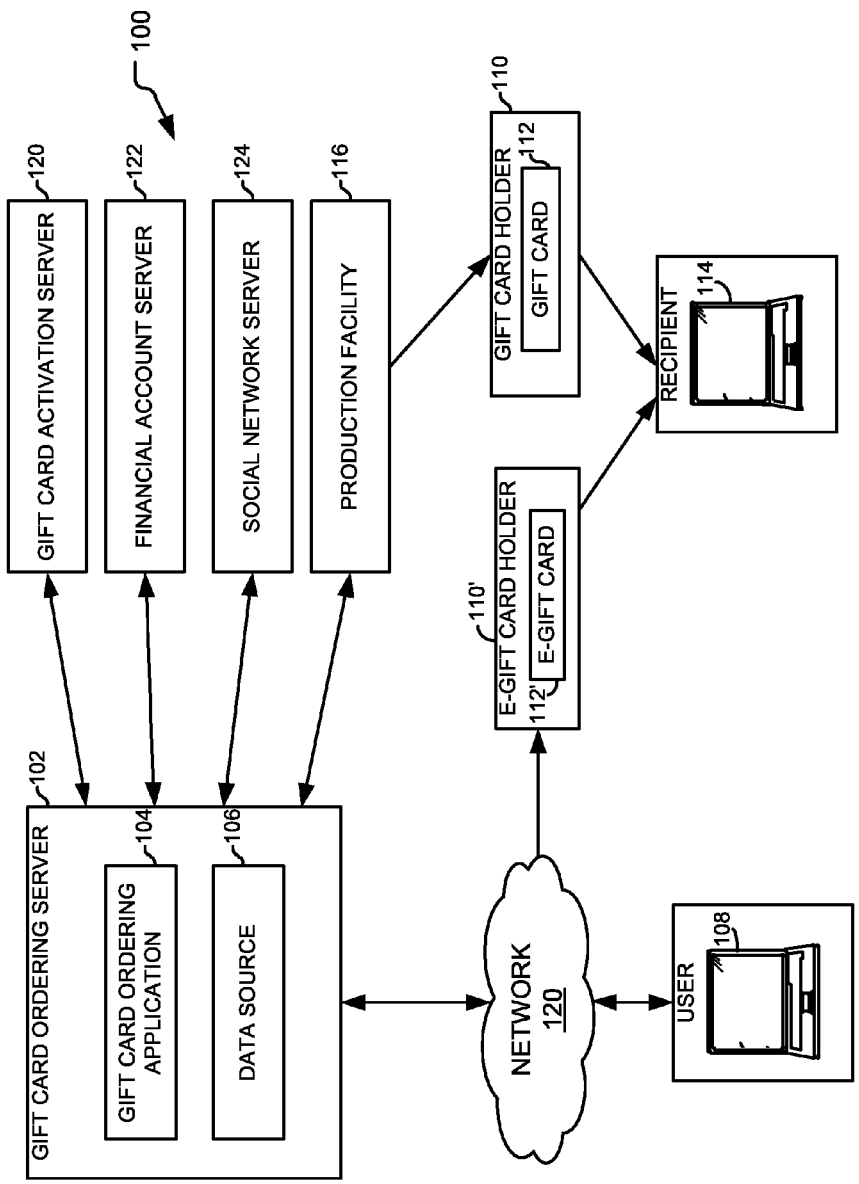
FIG. 1A is a block diagram of a computing system that includes a gift card ordering system according to an aspect of the gift card ordering system.
Figure 1B:
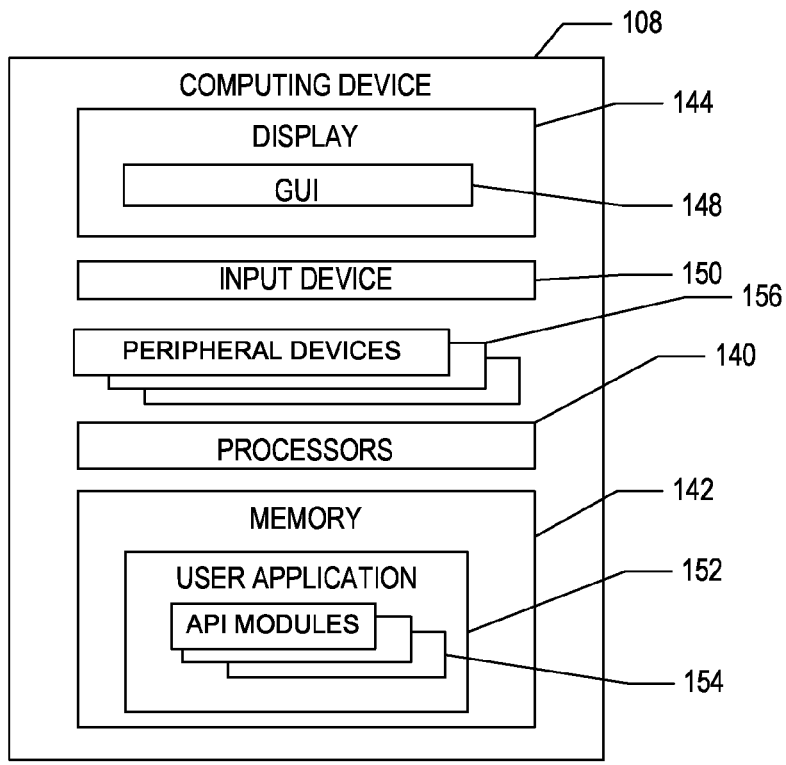
FIG. 1B depicts an exemplary embodiment of a computing device according to one aspect of the gift card ordering system.
Figure 1C:
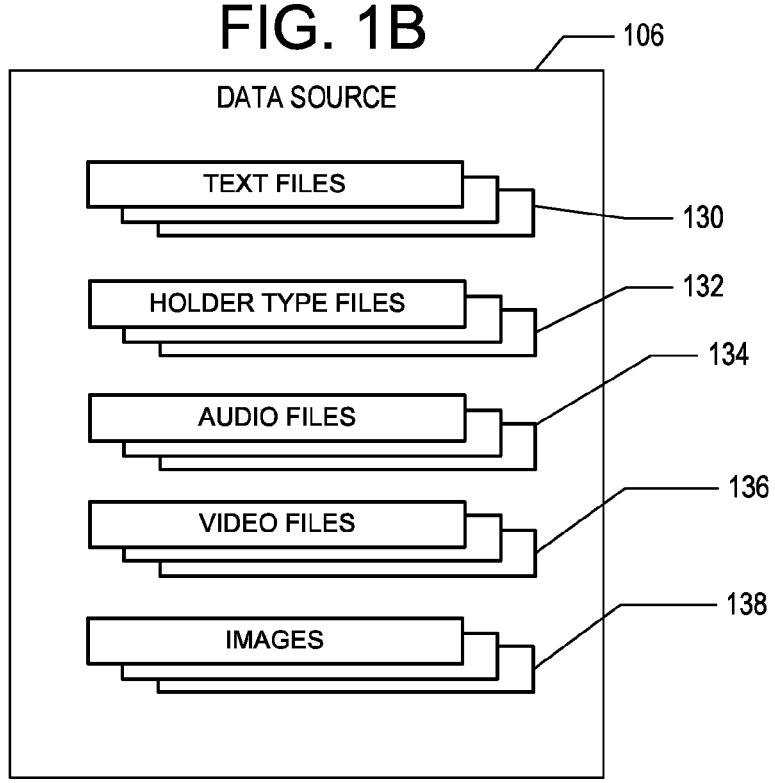
FIG. 1C depicts an exemplary embodiment of a data source according to an aspect of the gift card ordering system.

FIGS. 1A through 1C depict an example gift card ordering system 100 according to aspects of the disclosure. The system 100 includes a gift card ordering server 102 that includes a gift card ordering application 104 and a data source 106. As will be described in detail below, the gift card ordering application 104 receives personalized information from a computing device 108 of a user, and generates a gift card holder 110 that is sent to a recipient along with a selected gift card 112. The gift card holder/gift card combination may be a physical gift card holder 110 that is fabricated by a production facility 116 and a physical gift card 112 and sent to the recipient using a suitable mail delivery service. Alternatively, gift card holder/gift card combination may be a digital gift card holder 110' and digital gift card (e-gift card) 112' that is transmitted to a computing device 114 of the recipient via a messaging service, such as e-mail, a short message service (SMS), or a multimedia message service (MMS), or other suitable digital communication medium.

The server 102 communicates with a website of a retailer, such as a mail order retailer, or processing center of a retailer or other entity that processes incoming orders for products and fulfills these orders by managing shipment of the ordered product to the purchaser or other recipient and payment for the ordered product from the purchaser. The server 102 includes a processing system 202 (FIG. 2) that execute the gift card activation application 104 stored in computer readable media 204 (i.e., volatile and/or non-volatile memory) using the data source 106. Examples of a server 102 include one or more servers, personal computers, mobile computers and/or other mobile devices, and other computing devices. The server 102 may communicate via wireless and/or wireline communications.

The server 102 communicates with a gift card activation server 120 for activation of the gift card, and a financial account server 122 that is associated with a financial account of the user to provide payment for the activated gift card by the user. The financial account is any type, such as a credit card account, a debit card account, a GOOGLE WALLET™ account, or a PAYPAL™ account of the user. Prior to activation of the gift card, the server 102 facilitates a financial transaction between the gift card activation server 120 and the financial account server 122 associated with the user to provide payment for the gift card. The server 102 also communicates with a social network server 124 to obtain information about the user and/or recipient for suggesting additional content to be included with the gift card holder/gift card combination. Additionally, the server 102 communicates with the social network server 124 to obtain information about the user and/or recipient for suggestions regarding events or any special occasions (e.g., birthdays, anniversaries, weddings, expected graduation dates, and the like) associated with the user and/or recipient. For example, the server 102 may obtain information associated with a friend of the user indicating that the friend has an upcoming anniversary, and present this information to the user along with any gift card/gift card holder designs related to anniversaries so that the user can optionally select a particular gift card/gift card holder design to send to the friend (e.g., recipient).

The gift card activation server 120, the financial account server 122, the social network server 124, and the production facility 116 have one or more processors and executable instructions stored in volatile and/or non-volatile memory for performing the actions and/or steps described herein.

The data source 106 stores information that is used by the sender to generate a personalized (e.g., customized) gift card holder. In the particular embodiment shown, the data source 106 stores one or more text files 130, one or more holder type files 132, one or more pre-recorded audio files 134, one or more video files 136, and one or more pre-recorded image files 138 (i.e., photographs). In other embodiments, the data source 106 stores any suitable type of information for personalizing the gift card holder by the user. Although the data source 106 is shown as being located on, at, or within the local server 102, it is contemplated that the data source 106 can be located remotely from the local server 102 in other aspects of the system 100, such as on, at, or within a database of a data management system or a database of another computing device or system having at least one processor and volatile and/or non-volatile memory.

The communication network 120 can be the Internet, an intranet, or another wired and/or wireless communication network. In one aspect, one or more of the server 102 and the computing device 108 communicate with one another using any suitable protocol or messaging scheme. For example, the server 102 and computing device 108 communicates using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows the server 102 communicating with the computing device 108 through a network, other embodiments contemplate the server 102 communicating directly with the computing device 108 without the use of a separate and a distinct network. Additionally, other embodiments contemplate that the modules employed by the server 102 and the computing device 108 are integrated in one computing system. Further, the servers 120, 122, 124, and production facility 116 alternatively communicates with the gift card activation server 102 via the network 120.

The gift card ordering application 104 provides a mechanism for generating a gift card holder 110 includes personalized content by uploading one or more photographs, customized text messages such as a greeting, add pre-recorded songs and/or sound or voice messages and include this content with the gift card holder 110. The user accesses the system 100 via the computing device 108 hosted by the gift card ordering server 102 using an HTML link or other suitable entry point, such as through application software (i.e., a mobile app) executed on a portable computing device, such as a wireless communication device. The gift card ordering application 104 then either transmits this information to a production facility 116 where the physical gift card holder 110 is fabricated according to the received information, and subsequently sent along with a selected physical gift card 112 to the recipient, or generates a digital gift card holder 110', digital gift card 112' combination that is digitally transmitted to the recipient using an e-mail message, a short message service (SMS), via a social media account, or other suitable digital communication medium.

FIG. 1B depicts an example embodiment of a computing device 108 according to one aspect of the gift card ordering system 100. The computing device 108 is a computing or processing device that includes one or more processors 140 and memory 142. For example, the computing device 108 can be a personal computer, such as a laptop or notebook computer, a workstation, or other processing device such as a personal digital assistant or a tablet computer. The computing device 108 includes a display 144, such as a computer monitor, for displaying data and/or a graphical user interface 148. The computing device 108 also includes an input device 150, such as a keyboard or a pointing device (e.g., a mouse, trackball, pen, or touch screen) to enter data into or interact with the graphical user interface 148. In one embodiment, the display 144 comprises a touch-screen device in which input is provided via contact by the user with the touch-screen device. The computing device 108 receives data and/or communications from, and/or transmit data and/or communications to, the server 102 via the communication network 120.

The computing device 108 includes a user application 152 stored in the memory 142 and executed on the processors 140 to generate the graphical user interface (GUI) 148 to the display 104. The graphical user interface 148 enables the computing device 108 of the user to interact with one or more data entry forms received from the server 102 to enter order detail data and submit orders to the application 104. In one embodiment, the user application 152 includes a web browser that displays interactive web pages, applets, or other suitable user interface mechanisms including one or more selectable fields, editing screens, and the like for selecting content and/or modifying pre-recorded content by the user (i.e., sender). In another embodiment, the GUI application 152 includes application software (i.e., a mobile app) that is executed on the computing device 108, which is, for example, a wireless communication device for providing one or more selectable fields, edit screens, and the like for selecting content and/or modifying pre-recorded content by the user.

According to an aspect of the present disclosure, the user application 152 also includes one or more application program interface (API) modules 154 for communicating with one or more peripheral devices 156 configured in the computing device 108. The API modules 154 include any type that receives user-supplied content from the user. For example, the API modules 154 include a keyboard for receiving alpha-numeric text information from the user, a microphone for receiving audio content from the user, and/or a camera for receiving photographic or video content from the user. As another example, the user application 152 may expose the API modules 154 for use by one or more other systems, such as such as PAYPAL™, or GOOGLE WALLET™, so that these systems may also communicate with the peripheral devices 156 for receiving user-supplied content from the computing device.

Figure 2:
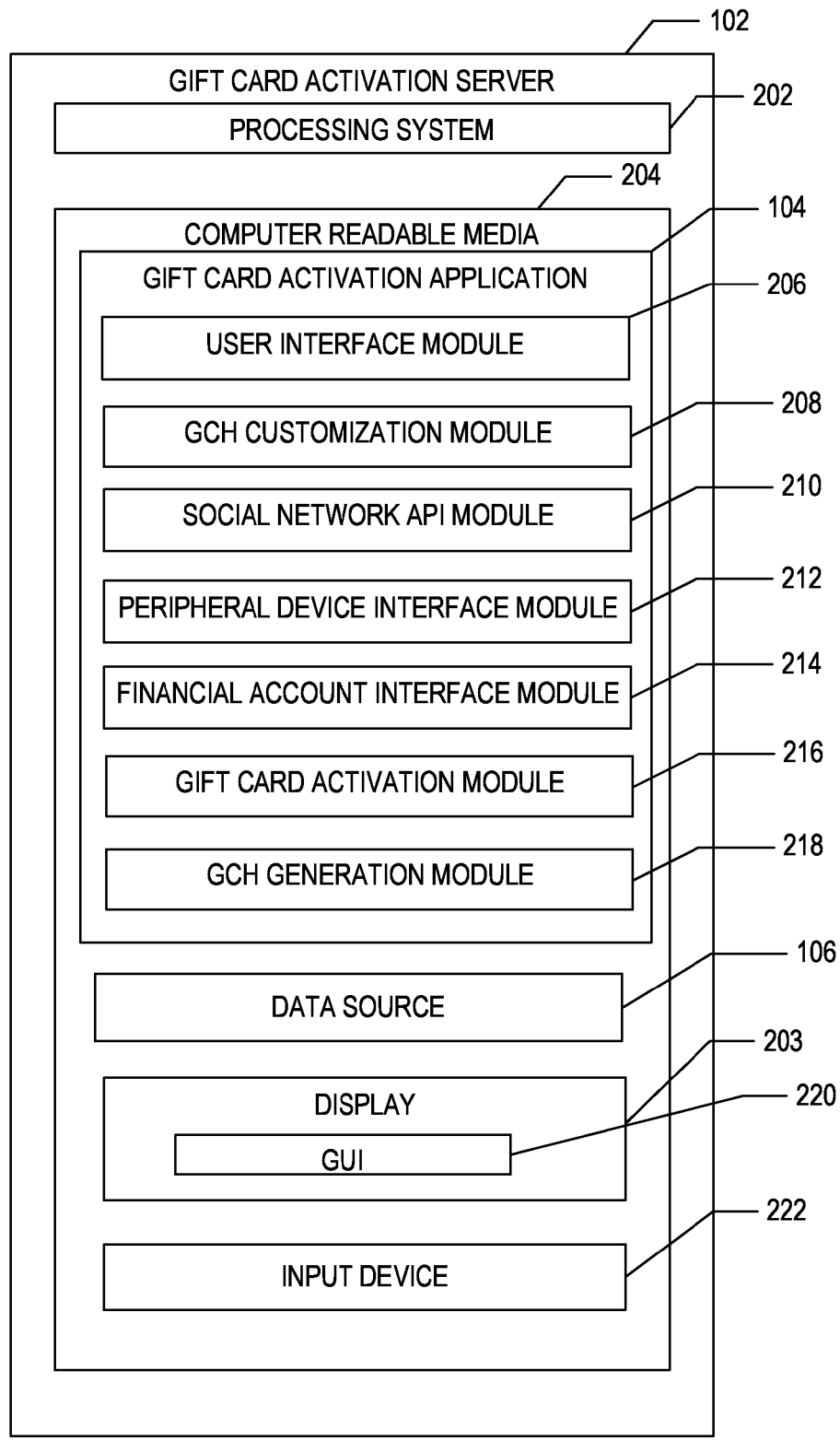
FIG. 2 is a block diagram of a computing system that includes a gift card ordering system according to an aspect of the gift card ordering system.

FIG. 2 is a block diagram depicting an example gift card ordering application 104 executed on the gift card ordering server 102. According to one aspect, the gift card ordering server 102 includes a processing system 202 that includes one or more processors or other processing devices. A processor is hardware. The processing system 202 executes the gift card ordering application 104 to generate the GUI 148 on the computing device 108 for receiving customized information from the user and generating a personalized gift card holder that is combined with a gift card to be sent to a recipient. According to another aspect, the gift card ordering server 102 also includes a display 203, such as a computer monitor, for displaying data and/or a graphical user interface 220. The gift card activation server 202 also includes an input device 222, such as a keyboard or a pointing device (e.g., a mouse, trackball, pen, or touch screen) to enter data into or interact with the graphical user interface 220.

According to one aspect, the gift card ordering server 102 includes a computer readable medium 204 configured with the gift card ordering application 104. The gift card ordering application 104 includes instructions or modules that are executable by the processing system 202 to generate a customized gift card holder to be sent to a recipient along with a selected gift card.

The computer readable medium 204 includes volatile media, nonvolatile media, removable media, non-removable media, and/or another available medium that can be accessed by the gift card ordering server 102. By way of example and not limitation, computer readable medium 204 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media embodies computer readable instructions, data structures, program modules, or other data and include an information delivery media or system.

A user interface module 206 facilitates the receipt of data and/or other communications from the computing device 108 of the user. In one example, the user interface module 206 communicates with the computing device 108 using a web browser executed on the computing device 108 to provide one or more selectable fields, editing screens, and the like for receiving content and/or modifying pre-recorded content by the user (i.e., sender). In another example, the user interface module 206 communicates with the computing device 108 using application software (i.e., a mobile app) executed on a computing device 108, such as a wireless communication device or tablet computer, to provide one or more selectable fields, editing screens, and the like for receiving content and/or modifying pre-recorded content by the user (i.e., sender). In yet another example, the user interface module 206 communicates with one or more peripheral devices 156 of the computing device 108 to receive user-supplied content to be included on the gift card holder and/or the gift card.

A gift card holder customization module 208 receives personalized content from the computing system 108, and provides for the customization of content, such as content received from the user interface module 206. For example, the gift card holder customization module 208 receives personalized content generated by the user and processes the received user-supplied content to generate customized content to be included in the gift card holder. For another example, the gift card holder customization module 208 receives user selection of a holder type including a particular design associated with a special occasion, which is, for example, a birthday, wedding, or a holiday, such as Christmas, Easter, Thanksgiving, and the like.

The user-supplied content also includes, for example, content stored in the data source 106, such as pre-recorded text information from pre-recorded text files 130, pre-recorded audio information from pre-recorded audio files 134, pre-recorded image information from pre-recorded image files 138, pre-recorded video information from pre-recorded video files 136, and/or a gift card to be included with the gift card holder that is further manipulated by the user via the GUI 148. In a particular embodiment, the user-supplied content includes pre-recorded content including a song or a portion of a pre-recorded song that is copyrighted and licensed by the owner of the copyrighted song. The gift card holder customization module 208 modifies existing content, such as pre-recorded content or other previously received content, based upon input received from the computing system 108. An example of modifying existing content includes modifying a received photograph using one or more photograph editing features that provides for cropping, color hue adjustment, brightness adjustment, sizing, and/or other features associated with manipulation of digital imagery.

A social network API module 210 provides an interface to one or more social network web sites to provide additional information for customizing a gift card holder. For example, the social network API module 210 accesses the API of a social media outlet to obtain personalized information associated with one or more recipients to aid in customizing the gift card holder. For a particular example using a FACEBOOK™ social network, the social network API module 210 identifies all friends having a birthday this month and send gift card/gift card holder combinations to each friend. For another particular example using the FACEBOOK™ social network, the social network API module 210 obtains from the social network server 124, personal information associated with the recipient and provide this information to the user in order to allow the user to select an appropriate gift card.

A peripheral device interface module 212 provides an interface to one or more peripheral devices of the computing device, such as a global positioning system (GPS) device, a camera, a microphone, and other device configured on the computing system 108. For example, the peripheral interface module 212 uses location information associated with a GPS device to aid in selecting pertinent gift card design (e.g., when vacationing at Grand Canyon, the gift card ordering application 104 uses the peripheral device interface module 212 to select imagery of canyon to include as the design of the holder). For another example, the peripheral device interface module 212 receives audio, still imagery, and/or video content using the microphone and/or camera configured on the computing device 108.

A user financial account API module 214 communicates with a payment processing server, such as the financial account server 122, to transact a monetary transfer of funds from the user's financial account to a financial account of a merchant of the gift card. In one example, the user financial account API module 214 includes an application program interface (API) for coordinating a monetary transaction (e.g., online money transfer) through an e-commerce provider, such as PAYPAL™, online credit card systems, or other suitable third party financial clearing entity. In another example, the user financial account API module 214 encodes monetary transaction information provided by the user and transmits this information to the gift card activation server 120 such that the gift card activation server 120 may communicate with the financial account server 122 of the user for transacting funds necessary for activating the gift card.

The gift card activation API module 216 communicates with the gift card activation server 120 for activation of the gift card. For example, the gift card activation server 120 is a server managed by a merchant associated with the gift card. For another example, the gift card activation server 120 is a third party server of a third party gift card activation service for activation of the gift card, such as SVS™, STORE FINANCIAL™, and the like.

A gift card holder (GCH) generation module 218 facilitates the generation of the gift card holder to be sent to the recipient along with the selected gift card. In one example, the gift card/gift card holder combination is generated in digital form and transmitted to the recipient via any suitable communication mechanism, such as via an e-mail message, or a short message service (SMS) message. In another example, information associated with the gift card/gift card holder combination is transmitted to a production facility 116 for generating a physical gift card holder, from which a gift card is inserted and sent to the recipient via a mail delivery service, such as the UNITED PARCEL SERVICE-™(UPS).

It should be appreciated that the modules described herein is provided only as an example of a computing device that executes the gift card ordering application 104 according to the teachings of the present invention, and that other computing systems may have the same modules, different modules, additional modules, or fewer modules than those described herein. For example, one or more modules as described in FIG. 2 is combined into a single module. As another example, certain modules described herein is encoded on, and executed on other computing systems, such as the computing device 108 used by the user.

Figure 3:
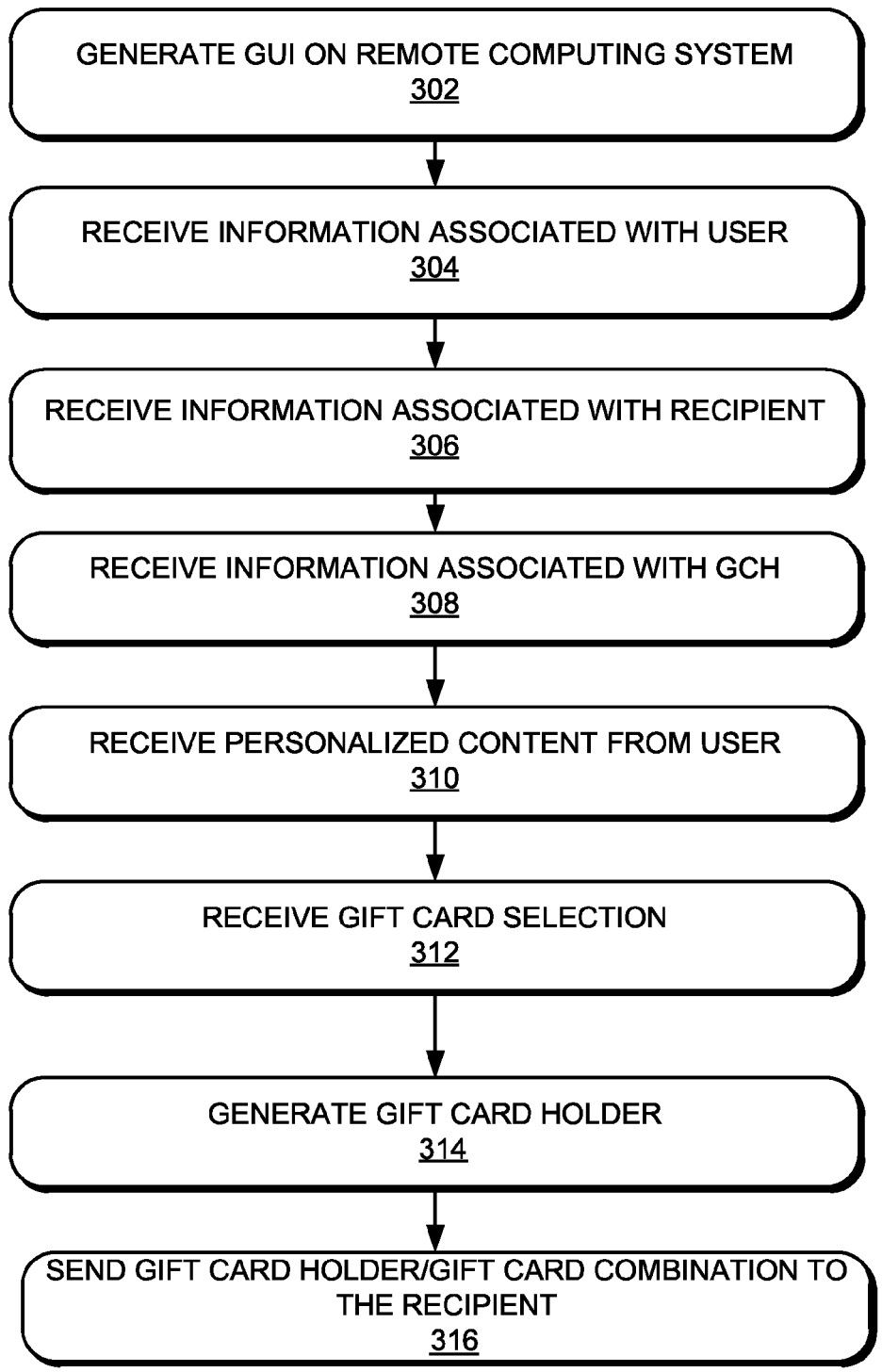
FIG. 3 is a flowchart depicting a process for creating a personalized gift card holder according to an aspect of the gift card ordering system.
Figure 12:
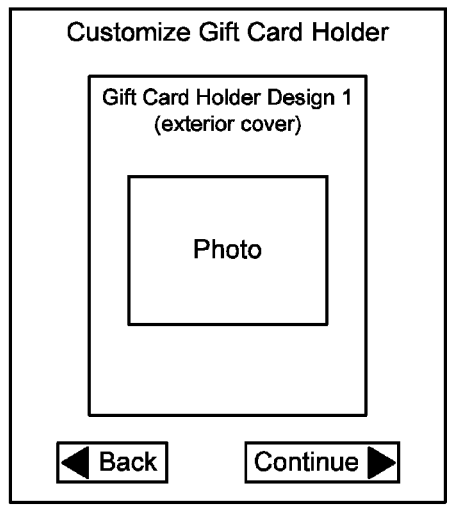
FIG. 12 illustrates an example of a holder customization page of a user interface according to an aspect of the gift card ordering system.
Figure 13:
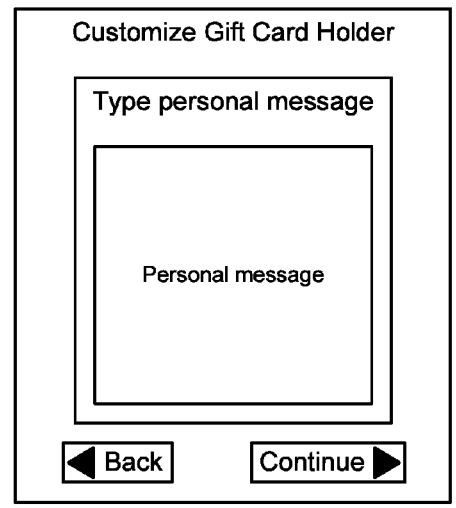
FIG. 13 illustrates an example of a holder customization page of a user interface according to an aspect of the gift card ordering system.
Figure 14:
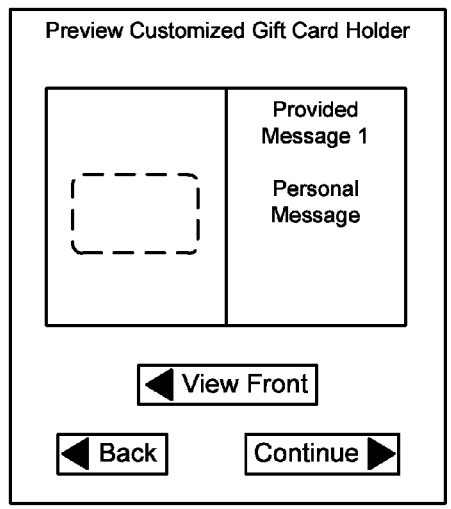
FIG. 14 illustrates an example of a holder preview page of a user interface according to an aspect of the gift card ordering system.
Figure 15:
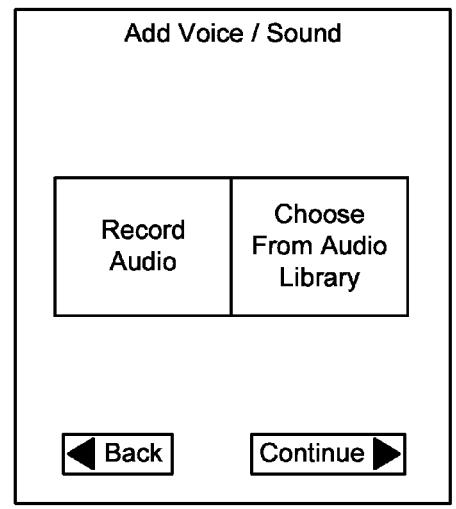
FIG. 15 illustrates an example of an audio selection page of a user interface according to an aspect of the gift card ordering system.
Figure 16:
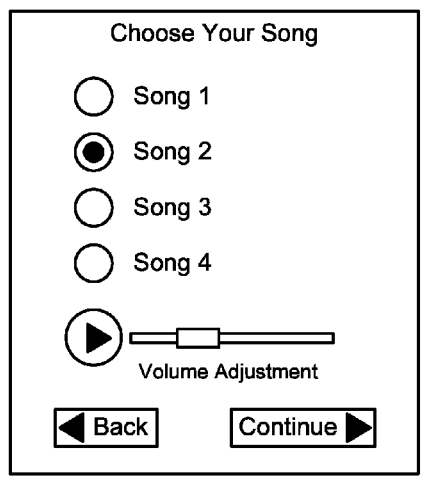
FIG. 16 illustrates an example of a song selection page of a user interface according to an aspect of the gift card ordering system.
Figure 17:
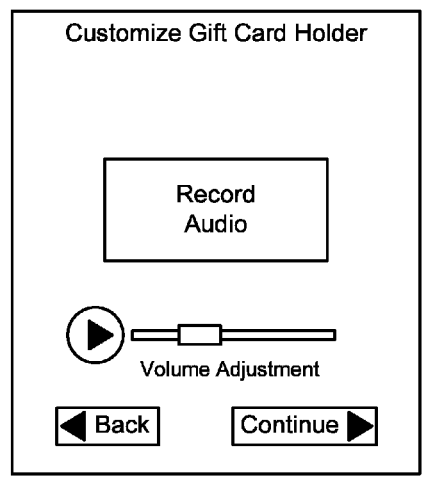
FIG. 17 illustrates an example of an audio record page of a user interface according to an aspect of the gift card ordering system.

FIG. 3 illustrates an example process that is performed by the gift card ordering application 104 according to the teachings of the present disclosure.

In step 302, the gift card ordering application 104 receives a request from a computing device 108 and generates a GUI on the computing system for receiving personalized information from the user. In one embodiment, the GUI is generated as a web page that is rendered by a web browser executed on the computing device 108 through a network, such as the Internet. In another embodiment, the GUI is generated by application software (i.e., a mobile app) designed to be executed on a computing device 108 embodied as a wireless communication device, a tablet computer, or other similar type of portable computing device.

The user accesses the system 100 via the computing device 108 via the user interface of the computing device 108 hosted by the gift card ordering server 102. A user may arrive at the system interface via an HTML link or other suitable entry point, such as through a mobile app executed on a portable computing device. The user typically initiates the online personalized gifting transaction by requesting a URL of the server 102 through a browser or by launching the mobile app on a portable computing device, such as a wireless communication device or portable tablet computer from which the GUI is generated on the computing device 108.

In some embodiments incorporating a mobile app that is executed on a portable computing device, a first or main screen display is provided showing elements such as text and graphics describing and explaining use of the system. The main screen also displays one or more banners showing seasonal offers provided to the user. In certain embodiments, the user can scroll through multiple banners using a finger swipe or other means, such as arrow keys, provided by the portable computing device for controlling and interacting with the mobile app executed on the portable computing device. Typically, the main screen also includes text and graphics comprising a primary navigation element, such as a "Get Started" button, that is activated by a screen touch or other selection means provided by the mobile device to advance the user to the next screen.

In step 304, the gift card ordering application 104 optionally receives information associated with the user. For example, the gift card ordering application 104 generates a splash screen (FIG. 4) on the computing device from which a sign-in screen (FIG. 5) is accessed by the computing device. In the event that the user has not yet established an account, the gift card ordering application 104 generates a registration screen (FIG. 6) on the computing device for registration of the user. In other embodiments, information associated with the user without the splash screen, sign-in screen, and registration screen as shown in FIGS. 4-6, respectively if registration of the user is not needed or desired. It is important to note that the screens of FIGS. 4-6 in addition to the screens of FIGS. 5-22 of the present disclosure may refer to screens generated by a mobile app on a computing device, such as smartphone as well as screens generated by a web browser on a computing device, such as a home computing system.

In step 306, the gift card ordering application 104 optionally receives information associated with a recipient. For example, the gift card ordering application 104 generates a recipient information screen (FIG. 7) to receive one or more identifying elements of the recipient from the user. The gift card ordering application 104 also generates a second recipient information screen (FIG. 8) to receive one or more other elements of information of the recipient, such as a location where the recipient resides, an age of the recipient, and any interests of the recipient. It is important to note that FIGS. 7 and 8 merely show one embodiment of recipient information that is received by the gift card ordering application 104; other examples however, provides for receipt of any type of recipient information. Alternatively, the gift card ordering application 104 obtains personal information of the recipient using one or more social network sites, such as FACEBOOK™. As will be described in detail below. The gift card ordering application 104 uses this information to provide targeted suggestions to the user for designing the gift card holder and/or selection of a gift card.

Certain embodiments of the system 100 provide a technique for a user to view and select social media contacts (e.g. FACEBOOK™ friends) via social media APIs that provide contact information and demographics that the system utilizes to provide gifting recommendations to the user. The system, for example, provides the user with a listing of all contact birthdays within a specified or system-determined period of time (e.g. 30 days), and allows the user to select a contact from the list and then proceed with creating a personalized gift via the system as described herein below.

In step 308, the gift card ordering application 104 receives gift card information from the computing device 108. For example, the gift card ordering application 104 presents an occasion screen (FIG. 9) for entry of a particular occasion by a user of the computing device 108. As another example, the gift card ordering application 104 presents a gift card holder selection screen (FIG. 10) for selection of a particular type of design to be placed on the gift card holder. For a particular example in which the selected occasion is Christmas, the gift card ordering application 104 presents multiple designs that alternatively include a Christmas tree, a manager scene, three wise men on a desert journey, and the like. The user, via the computing device 108, selects one particular design for further personalization.

The user selects the gift card information by searching for specific gift cards via occasion, category (e.g., dining, spa, hotel, shopping, or event), brand, and/or recipient (e.g., him, her, teens, kids, or babies) associated with gift cards. The user can also filter by geographic location, using city and state, street address, or zip code information. In some embodiments, the user can search for a specific gift card by accessing the system 100 via a device having GPS or other geographic locator capabilities in which the location is determined and transferred directly to the system via geographic data provided by the GPS device. In some embodiments, the gift card brand selection is made by initiating the transaction through a specific merchant website. The user then selects a gift card corresponding to a particular offer. Typically, an offer will comprise a particular business entity or venue and may be, for example, a restaurant, hotel, theater, store, or shopping district. In some embodiments, the user also selects particular design graphics or indicia to appear on the gift card. The user then selects a gift card denomination or enters a desired denomination amount to load or associate with the gift card. In certain embodiments the user searches by experience and thus select multiple brands available via a single gift card (e.g., dinner and a movie) or a gift card that is pre-denominated (i.e., a preset monetary value). Gift cards may also be pre-selected if the user accesses the system via a vendor website, in which case the vendor identity is provided by the vendor site to the system.

In step 310, the gift card ordering application 104 receives personalized content from the GUI (FIGS. 11-19). For example, the gift card ordering application 104 presents an interactive screen (FIG. 11) to receive selection of a photograph from either a social media website, from the phone on which the GUI is displayed, or from a camera configured on the phone. It should be understood herein that the gift card ordering application 104 uploads content from any suitable computing device 108 on which the GUI is displayed, such as a workstation, notebook computer, or tablet computer. As another example, the gift card ordering application 104 also displays the selected photograph on a portion of the gift card holder (FIG. 12) and provides for editing of the photograph using typical editing techniques such as cropping, color hue adjustment, and the like. As another example, the gift card ordering application 104 presents a personal message entry screen (FIG. 13) that allows for the entry of a text message by a user of the computing device 108. Once any photographs and/or text messages are received from the computing device 108, the gift card ordering application 104 displays a preview screen (FIG. 14) to show how the gift card holder will look.

Figure 18:
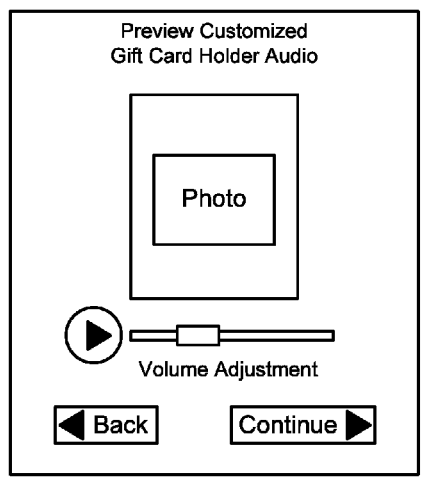
FIG. 18 illustrates an example of an audio preview page of a user interface according to an aspect of the gift card ordering system.
Figure 19:
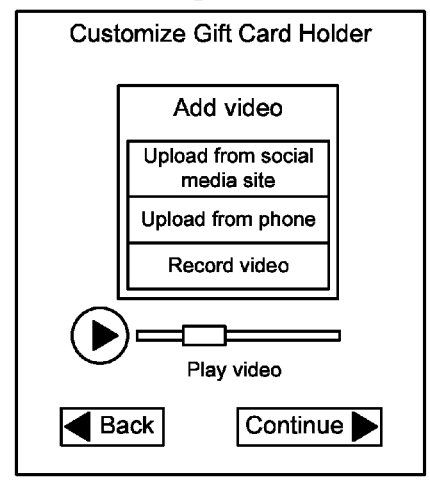
FIG. 19 illustrates an example of a video template selection page of a user interface according to an aspect of the gift card ordering system.
Figure 20:
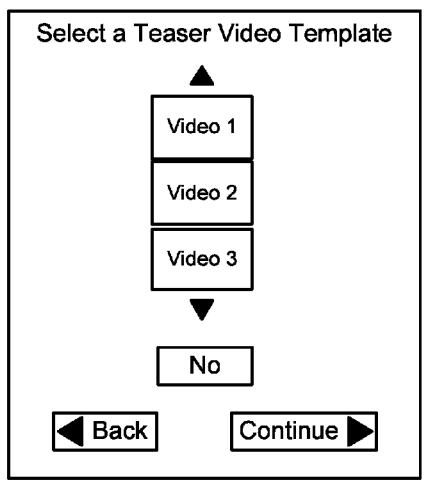
FIG. 20 illustrates an example of a video template selection page of a user interface according to an aspect of the gift card ordering system.

According to one embodiment, the gift card ordering application 104 provides for selection or creation of audio content for the gift card holder by the user. The gift card ordering application 104 presents an audio selection screen (FIG. 15) that allows the user to either select a pre-record audio segment or create an audio segment, such as an audio file stored in 'mp3' or 'way' format. If the gift card ordering application 104 receives selection of a pre-recorded audio segment, an audio selection screen (FIG. 16) is generated that allows for selection of a particular audio file by the user of the computing device 108. However, if the gift card ordering application 104 receives selection of an audio creation, an audio generation screen (FIG. 17) is generated to receive an audio segment from the computing device 108. In one embodiment, the GUI has access to the API associated with the microphone of the computing device 108 such that the audio segment is obtained directly from the microphone of the computing device 108. Although not shown, the gift card ordering application 104 also place or receive a plain old telephone service (POTS) phone call to receive audio content to be included with the gift card holder. Additionally, the gift card ordering application 104 can upload a previously recorded audio file from the computing device 108 for inclusion with the gift card holder. The gift card ordering application 104 displays a preview screen (FIG. 18) in which the selected audio segment is played along with any previously selected video and/or text content as shown in FIG. 18.

According to another embodiment, the gift card ordering application 104 provides for addition of video content for the gift card holder. The video content is included with the gift card holder or is sent separately to the recipient as a 'teaser video'.

To provide video content, the gift card ordering application 104 presents a video selection screen (FIG. 19) that allows the user to either upload a video segment from a social media website, upload an existing, previously recorded video segment, or record a video segment. If a teaser video is to be implemented, the gift card ordering application 104 presents a teaser video template screen (FIG. 20) that provides template for the recorded video. Each template includes a structure, such as the recording time, screen density, and any textual or graphic embellishments that is displayed along with the teaser video segment.

In one embodiment, the teaser video includes a template-based FLASH™ video file having predetermined content structures (e.g., placement areas) that are marked and tracked within the video file. Uploaded content (e.g. text, audio, image, or video segments) are mapped within the content structures in the video file. Once content is uploaded and mapped to the content structures, the gift card ordering application 104 displays a preview of the teaser video through a suitable video player. The application 104 then saves the video as a teaser video (e.g. Flash video file) that is set for streaming from a video management system, such as the retailer video message management module 220 via a suitable content delivery network (e.g. Rackspace or Akamai CDN).

In one embodiment, the teaser video may be composited using any mechanism, which may include a system specific custom compositing engine based on Open Source Media Framework Template Flash video files provided by ADOBE™. The video may be viewed using any mechanism, such as a system specific, custom video player based on the Open Source Media Framework. The gift card ordering application 104 includes a Rackspace Content Delivery Network server for storing the uploaded user images and a video server for storage and streaming of the teaser videos. Additionally, via SWF to MP4 Conversion Tools, the gift card ordering application 104 encodes the teaser videos into an MP4 format for optional playback on mobile devices. In certain embodiments, the gift card ordering application 104 encodes the teaser video in HTML5format to play audio and video within webpages and, for example, to construct and play videos provided by the system. In one embodiment, the GUI has access to the API associated with the camera of the computing device 108 such that the video segment is obtained directly from the camera of the computing device 108.

Figure 21:
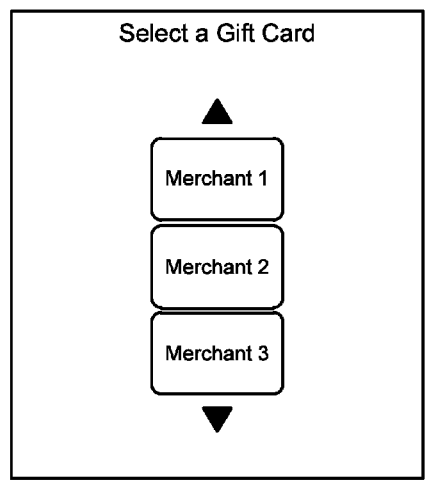
FIG. 21 illustrates an example of a gift card merchant selection page of a user interface according to an aspect of the gift card ordering system.
Figure 22:
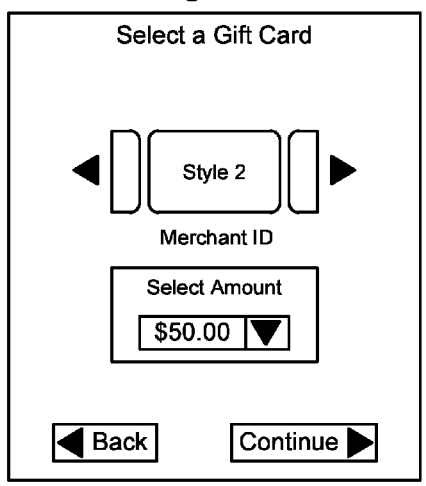
FIG. 22 illustrates an example of a gift card style selection page of a user interface according to an aspect of the gift card ordering system.

In step 312, the gift card ordering application 104 receives selection of a gift card to accompany the gift card holder designed and personalized in steps 302 through 310. For example, the gift card ordering application 104 generates a gift card selection screen (FIG. 21) that allows the user to select one or more gift cards to accompany the personalized gift card holder. In one embodiment, the gift card ordering application 104 uses personal information obtained from one or more social media outlets to generate a suggested list of merchants from which to choose. For example, if personal information associated with the recipient indicates that the recipient enjoys automobile racing, the gift card ordering application 104 aggregates gift card offerings from merchants that provide racing equipment or other automobile equipment, such as aftermarket automobile parts, automobile service centers, and the like. Once the merchant type is selected as shown in FIG. 21, the gift card ordering application 104 presents a gift card customization screen (FIG. 22) that allows the user to enter a particular style and a monetary amount for the gift card. The style of the gift card includes one of multiple background images that are to be displayed on the card.

Certain embodiments of the system provide a mechanism to use the system 100 for charitable giving by providing an option for the user to select a gift card as a means for a charitable donation. The recipient receives the card, selects a charity, and the selected charity receives a donation per the value of the card. The system of the present invention is used to provide enhancements to the charitable gifting experience, both for the user and the recipient, such as by means of personalized gift card holders including graphic, text, audio and/or video content, and by sending the recipient a video teaser in advance of receipt of the gift card.

In step 314, the gift card ordering application 104 generates a gift card holder in accordance with information provided by the user of the computing device in steps 302 through 310. In one embodiment, the gift card ordering application 104 generates a gift card holder/gift card combination in digital form. In another embodiment, the gift card ordering application 104 sends information associated with the gift card holder/gift card combination to a production facility for generating the gift card holder/gift card combination in physical form. That is, the gift card ordering application 104 transmits the information associated with the gift card holder/gift card combination to a production facility whereby a gift card holder (FIG. 23 or 24) is fabricated using conventional printing techniques on a physical medium, such a paper cardstock, plastic sheet, parchment, or other suitable print media.

In step 316, the gift card ordering application 104 sends the gift card holder/gift card combination to the recipient. For the embodiment above in which the gift card holder/gift card combination is generated in digital form, the application 104 transmits the gift card holder/gift card combination to the user via any suitable digital format, such as via an e-mail message, via a short message service (SMS) message, or via a social media account. However, for the embodiment above in which the gift card holder/gift card combination is generated in physical form by the production facility, the gift card holder/gift card combination is sent to the recipient via a mail delivery service.

The process described above is performed repeatedly for additional gift card holder/gift cards to be sent to one or more recipients. When use of the gift card ordering application 104 is no longer needed or desired, the process ends.

It should be appreciated that the steps described herein is provided only as an example of a process that is performed by the gift card ordering application 104 according to the teachings of the present invention, and that the gift card ordering application 104 may perform fewer, more, or different types of steps than those described herein. For example, the gift card ordering application 104 performs multiple steps described above as a single step. As another example, certain steps described herein is performed by other components of the gift card ordering system 100, such as by the computing device 108 used by the user.

FIGS. 23 and 24 illustrate example gift card holder/gift card combinations that is generated by the gift card ordering system 100 according to embodiments of the present disclosure.

As shown in FIG. 23, the gift card holder 2300 includes a gift card 2302 and one or more customized text messages 2304 indicating whom the holder is from, whom the holder is addressed to, or other messages to be conveyed to the recipient. The fabricated gift card holder 2300 also includes a memory device 2306 for storage of imagery, audio files, and/or video files as described above, such that, upon receipt by the recipient, he or she may view imagery or play the audio/video files on a suitable playback device, such as a personal computer.

As shown in FIG. 24, the gift card holder 2400 includes a gift card 2402 and a customized message 2404 that is printed on the holder 2400. The gift card holder 2400 also include a customized image 2406 to be printed on the holder 2400, and a video/audio playback device 2408 that provides audio and video playback capability for any customized video/audio files. The video playback device 2408 includes a memory for storage of a video and audio files, and a display, such as a liquid crystal display (LCD) for playing the video file along with a speaker or other sound generation device for playing the audio file.

FIGS. 23 and 24 merely show two examples of physical gift card holder/gift card combinations that is provided by the gift card ordering application 104, other examples includes different combinations of components. For example, the gift card holder 2400 of FIG. 24 includes only a video playback device or may alternatively include only an audio playback device. Additionally, the customized messages, gift card, audio/video playback device, or images is arranged on the gift card holder in any suitable manner and in any suitable orientation with respect to one another.

FIGS. 25A through 25C illustrate several embodiments of example gift cards that is used with the gift card ordering system 100. The gift cards generally include pieces of planar-shaped card stock formed from inexpensive material, such as plastic having a front surface, such as shown in FIG. 25A, and a rear surface, such as shown in FIGS. 25B or 25C. The front surface includes indicia indicating a monetary amount 2502 and optionally includes an image 2504 that is associated with a merchant that issued the gift card. The rear surface includes a computer readable medium, such as a magnetic strip 2506 as shown in FIG. 25B or a barcode 2508 as shown in FIG. 25C.

It should be understood that the gift cards described herein above merely represent example gift cards that is used with the present disclosure, and that other types or styles of gift cards is used. For example, the gift card is a form printed on a conventional 8.5 inch by 11 inch sheet of paper that includes indicia indicating such information as the merchant and the monetary amount allocated to that gift card.

Those skilled in the art will appreciate that variations from the specific embodiments disclosed above are contemplated by the invention. The invention should not be restricted to the above embodiments, but should be measured by the following claims.

What is claimed is:

1. A method for creating a personalized gift card and teaser video, the method comprising:
providing an application to be executed on a computing device, the application comprising a peripheral application program interface (API) for interfacing with one or more peripheral devices of the computing device;

generating, by a server in communication with the computing device through a network, a graphical user interface (GUI) on the computing device using the application;

receiving, through the peripheral application program interface (API), user-supplied content, including at least one of user-supplied textual, audio, image, or video content from the one or more peripheral devices;

generating a gift card holder from the received user-supplied content; receiving, via the server, information associated with a merchant of a gift card and a monetary amount to be associated with the gift card; and c compositing, by a server, a teaser video to include the received user-supplied content by rendering the user-supplied content in one or more pre-defined fields of the teaser video, the teaser video indicating, to the recipient, that the gift card holder and the gift card are to be received; and transmitting the composited teaser video to the recipient along with or prior to transmission of the gift card holder and the gift card to a recipient.

2. The method of claim 1, wherein the computing device comprises a wireless communication device and the application comprises a mobile app that is executed on the wireless communication device.

3. The method of claim 1, wherein the computing device comprises a personal computing device and the application comprises a browser that is executed on the personal computing device.

4. The method of claim 1, wherein the gift card holder comprises a digital gift card holder and the gift card comprises a digital gift card, wherein transmitting the gift card holder and the gift card comprises transmitting the digital gift card holder and the digital gift card to the recipient via at least one of an e-mail message, a short message service (SMS) message, or a social media account.

5. The method of claim 1, wherein the application comprises a social media API for interfacing with a social media outlet, the method further comprising:
receiving personal information associated with the recipient via the social media API; and
display, through the GUI, one or more suggested gift cards according to the received personal information.

6. The method of claim 5, further comprising:
receiving personal information associated with the recipient via the social media API;
displaying, through the GUI, one or more gift card holder types according to the received personal information;
receiving a selected gift card type from the application; and
generating the gift card holder from the received gift card type.

7. The method of claim 1, wherein the received user-supplied content comprises audio content, the method further comprising:
providing a telephone number to a user of the computing device to record a voice message using a plain old telephone service (POTS) call session;
storing the voice message at the server;
retrieving the stored voice message from the server through the peripheral API; and,
incorporating the stored voice message into the gift card holder.

8. The method of claim 1, wherein the gift card comprises a charitable gift card.

9. The method of claim 1, further comprising:
receiving, from the application, information associated with a specified time of delivery of the gift card holder and associated gift card.

10. The method of claim 1, further comprising:
receiving, through the peripheral application program interface (API), location information associated with a location of the computing device from a GPS device in communication with the computing device;
selecting text, audio, image, or video content that is pertinent to the geographic location of the GPS device, and
generating the gift card holder according to the received location information, wherein the generated gift card holder incorporates the selected text, audio, image, or video content.

11. A personalized gift card and teaser video creation system comprising:
a memory;
a computing device;
an application executable by at least one processor of the computing device, the application comprising
a peripheral application program interface (API) for interfacing with one or more peripheral devices of the computing device, the application executable by the at least one processor to:
generate a graphical user interface (GUI) on the computing device;
receive user-supplied content, including at least one of user-supplied textual, audio, image, or video content from the one or more peripheral devices using the API;
receive gift card information associated with a merchant of a gift card and a monetary amount to be associated with the gift card; and
transmit the received user-supplied content to a server, wherein the server is configured to:
generate a gift card holder comprising the received user-supplied content,
facilitate a financial transaction to acquire a gift card associated with the received gift card information,
composite a teaser video that includes the received user-supplied content by rendering the user-supplied content in one or more pre-defined fields of the teaser video, the teaser video indicating, to the recipient, that the gift card holder and the gift card are to be received, and
transmit the teaser video along with or prior to the gift card holder and the gift card to a recipient.

12. The system of claim 11, wherein the computing device comprises a wireless communication device and the application comprises a mobile app that is to be executed on the wireless communication device.

13. The system of claim 11, wherein the computing device comprises a personal computing device and the application comprises a browser that is executable on the personal computing device.

14. The system of claim 11, wherein the gift card holder comprises a digital gift card holder and the gift card comprises a digital gift card, wherein the server is executable to transmit the digital gift card holder and the digital gift card to the recipient via at least one of an e-mail message, a short message service (SMS) message, or a social media account.

15. The system of claim 11, wherein the application comprises a social media API for interfacing with a social media outlet, the application is further executable to:
   receive personal information associated with the recipient via the social media API; and
   display, through the GUI, one or more suggested gift cards according to the received personal information.

16. The system of claim 15, wherein the application is further executable to:
   display, through the GUI, one or more gift card holder types according to the personal information received through the social media API;
   receive a selected gift card type from the application; and
   transmit the selected gift card type to the server, the server executable to generate the gift card holder from the received gift card type.

17. The system of claim 11, wherein the gift card comprises a charitable gift card.

18. The system of claim 11, wherein the application is further executable to:
   receive, from the GUI, time of delivery information associated with a specified time of delivery of the gift card holder and associated gift card; and
   transmit the time of delivery information to the server, wherein the server is executable to transmit the gift card holder and associated gift card to the recipient according to the received time of delivery information.

19. A non-transitory computer-readable medium comprising code or instructions, wherein the code or instructions, when executed by at least one processor, is operable to perform at least the following:
   providing an application to be executed on a computing device, the application comprising a peripheral application program interface (API) for interfacing with one or more peripheral devices of the computing device;
   generating, by a server in communication with the computing device through a network, a graphical user interface (GUI) on the computing device using the application;
   receiving, through the peripheral application program interface (API), user-supplied content, including at least one of user-supplied textual, audio, image, or video content from the one or more peripheral devices;
   generating a gift card holder from the received user-supplied textual, audio, image, or video content;
   receiving, via the server, information associated with a merchant of a gift card and a monetary amount to be associated with the gift card; and
   compositing a teaser video to include the received user-supplied content by rendering the user-supplied content in one or more pre-defined fields of the teaser video, the teaser video indicating, to the recipient, that the gift card holder and the gift card are to be received and
   transmitting the composited teaser video to the recipient along with or prior to transmission of the gift card holder and the gift card to a recipient.

20. The code of claim 19, wherein the computing device comprises a wireless communication device and the application comprises a mobile app that is to be executed on the wireless communication device.

21. A method for creating a personalized gift card and teaser video, the method comprising:
   providing an application to be executed on a computing device, the application comprising a peripheral application program interface (API) for interfacing with one or more peripheral devices of the computing device;
   generating, by a server in communication with the computing device through a network, a graphical user interface (GUI) on the computing device using the application;
   receiving, through the peripheral application program interface (API), user-supplied content, including at least one of user-supplied textual, audio, image, or video content from the one or more peripheral devices;
   receiving, via the server, information associated with a merchant of a gift card and a monetary amount to be associated with the gift card; and c
   compositing, by a server, a teaser video to include the received user-supplied content by rendering the user-supplied content in one or more pre-defined fields of the teaser video, the teaser video indicating, to the recipient, that the gift card is to be received; and
   transmitting the composited teaser video to the recipient along with or prior to transmission of the gift card to a recipient.

22. The method of claim 21, wherein the gift card comprises a digital gift card and wherein transmitting the gift card comprises transmitting the digital gift card to the recipient via at least one of an e-mail message, a short message service (SMS) message, or a social media account.

* * * * *